(12) United States Patent
Le Bris et al.

(10) Patent No.: US 9,758,681 B2
(45) Date of Patent: Sep. 12, 2017

(54) NON-STICK COATING COMPRISING AT LEAST ONE FUNCTIONAL DECORATIVE LAYER AND ITEM PROVIDED WITH SUCH A COATING

(71) Applicant: SEB S.A., Ecully (FR)

(72) Inventors: Stephanie Le Bris, Chambery (FR); Jean-Luc Perillon, Saint Paul Trois Chateaux (FR); Jean Waku, Chambery (FR); Hélène Serier-Brault, Orvault (FR); Stéphane Jobic, Bouguenais (FR)

(73) Assignee: SEB S. A., Ecully (FR)

( * ) Notice: Subject to any disclaimer, the term of this patent is extended or adjusted under 35 U.S.C. 154(b) by 0 days.

(21) Appl. No.: 15/323,992

(22) PCT Filed: Jul. 6, 2015

(86) PCT No.: PCT/FR2015/051868
§ 371 (c)(1),
(2) Date: Jan. 5, 2017

(87) PCT Pub. No.: WO2016/005694
PCT Pub. Date: Jan. 14, 2016

(65) Prior Publication Data
US 2017/0158879 A1 Jun. 8, 2017

(30) Foreign Application Priority Data

Jul. 8, 2014 (FR) ...................... 14 56590

(51) Int. Cl.
*C09D 5/26* (2006.01)
*C09D 7/12* (2006.01)
(Continued)

(52) U.S. Cl.
CPC .............. *C09D 5/26* (2013.01); *A47J 36/025* (2013.01); *C01B 33/24* (2013.01);
(Continued)

(58) Field of Classification Search
CPC .......... C09D 5/26; C09D 7/1216; C09D 1/00; C09D 127/18; C09K 9/00; C01G 49/0054;
(Continued)

(56) References Cited

U.S. PATENT DOCUMENTS 6,551,693 B1   4/2003   Buffard et al.

FOREIGN PATENT DOCUMENTS

| EP | 1121576 B1 | 5/2008 |
| FR | 1388029 | 2/1965 |

(Continued)

OTHER PUBLICATIONS

Sztanislav, A, et al., "Investigation of garnet formation by sintering of Y2O3 and Fe2O3", 1984, pp. 75-78, vol. 41, Journal of Magnetism and Magnetic Materials, Elsevier Science Publishers, Amsterdam, NL.

(Continued)

*Primary Examiner* — Michael C Miggins
(74) *Attorney, Agent, or Firm* — The Webb Law Firm

(57) ABSTRACT

Provided is a non-stick coating including at least one functional decorative layer, including a pigment composition having a reversible variation of optical and/or colorimetric properties when the coating is subjected to a temperature variation between a cold temperature of 0° C. to 40° C. and a hot temperature of 80° C. to 400° C. The pigment composition includes at least one compound of formula $Y_{(3-x)}M_xFe_{(5-y)}Q_yO_{12}$ in the form of particles, in which M is selected from the lanthanides, alkaline metals, alkaline-earth metals and metalloids with a degree of oxidation (DO) +3; Q is selected from the group made up of the lanthanides, non-metals with degree of oxidation +4, metals with DO +3 or +4, transition metals with DO +2 or +4, alkaline-earth (Continued)

metals and alkaline metals; and wherein x is between 0 and 0.3 and y is between 0 and 3.

13 Claims, 1 Drawing Sheet

(51) Int. Cl.
*C09D 1/00* (2006.01)
*C09D 127/18* (2006.01)
*C09K 9/00* (2006.01)
*C01G 49/00* (2006.01)
*C01B 33/24* (2006.01)
*A47J 36/02* (2006.01)
*G01K 11/14* (2006.01)
*C08K 3/22* (2006.01)

(52) U.S. Cl.
CPC ............ *C01G 49/0054* (2013.01); *C09D 1/00* (2013.01); *C09D 7/1216* (2013.01); *C09D 127/18* (2013.01); *C09K 9/00* (2013.01); *G01K 11/14* (2013.01); *C01P 2004/61* (2013.01); *C01P 2006/60* (2013.01); *C08K 3/22* (2013.01); *C08K 2003/2265* (2013.01)

(58) Field of Classification Search
CPC ........ C01B 33/24; A47J 36/025; G01K 11/14; C08K 3/22; C08K 2003/2265; C01P 2004/61; C01P 2006/60
See application file for complete search history.

(56) References Cited

FOREIGN PATENT DOCUMENTS

| | | |
|---|---|---|
| FR | 2038681 | 1/1971 |
| FR | 2784459 A1 | 4/2000 |
| FR | 2891844 A1 | 4/2007 |
| GB | 1284496 | 8/1972 |

OTHER PUBLICATIONS

Vaqueiro, P, et al., "Influence of complexing agents and pH on Yttrium-iron garnet synthesized by the sol-gel method", 1997, pp. 2836-2841, vol. 9, Chm. Mater., American Chemical Society, US.
Serier-Brault, Helene, et al., "Thermochromism in Yttrium Iron Garnet Compounds", 2014, pp. 12378-12383, vol. 53, Inorg. Chem., American Chemical Society, US.

NON-STICK COATING COMPRISING AT LEAST ONE FUNCTIONAL DECORATIVE LAYER AND ITEM PROVIDED WITH SUCH A COATING

CROSS-REFERENCE TO RELATED APPLICATIONS

This application is the United States national phase of International Application No. PCT/FR2015/051868 filed Jul. 6, 2015, and claims priority to French Patent Application No. 1456590 filed Jul. 8, 2014, the disclosures of which are hereby incorporated in their entirety by reference.

FIELD OF THE INVENTION

This invention generally pertains to non-stick coatings comprising at least one functional decorative layer, as well as items comprising such coatings.

For the purposes of this invention, the term "functional decoration" refers to a decoration that guides the user of the item in its use.

The relevant field is, first and foremost, that of cooking tools, but this invention may also pertain to any other type of surface, such as the soleplate of an iron, the plates of a hair straightening iron, or even the cover of a household appliance.

Examples of cooking tools that can be used within the scope of this invention include frying pans, sauté pans, saucepans, woks, crepe pans, stockpots, soup pots, Dutch ovens, egg cookers and grill pans.

DESCRIPTION OF RELATED ART

It is essential for a user of such items to be able to see the change in temperature of an item during use when said item is heated. In the case of a cooking tool, proper temperature control while the food is cooking is necessary for health and flavor purposes (for example, for searing a steak on a grill or in a frying pan), but also for limiting the periodic over-heating that weakens the coating of the cooking tool. A less-overheated material will have a longer lifespan. Food cooked at a lower temperature will have healthier organoleptic characteristics. Additionally, cooking at just the necessary temperature limits the energy consumed and therefore the environmental impact.

Existing patent document FR 1388029 describes a cooking utensil provided with a heat indicator consisting of a heat-sensitive body that changes color according to temperature in a reversible manner, this heat indicator being formulated in a non-stick coating, made of polytetrafluoroethylene (PTFE) in particular. A heat-stable pigment (which is a mineral or organic compound that demonstrates very slight color change, or even no color change, when it is subjected to a temperature increase within a given temperature range) can also be incorporated into the cooking utensil as an indicator, to make it possible to assess the relative color change of the heat indicator, and therefore the change in temperature. However, the simple combination of a heat-stable pigment and a heat-sensitive pigment does not make it possible to clearly discern the change in temperature.

To remedy these problems, a thermochromic pigment-based heat indicator was developed, as described in patent document EP 1121576. This heat indicator is a decoration comprising at least two patterns, one that is thermochromic pigment-based, of the iron oxide type, which darkens with the rise in temperature, and another that is thermochromic pigment-based that lightens very slightly with the rise in temperature, comprising a mixture of perylene red and spinel black. It follows that at a predetermined temperature (that can be set between 160° C. and 220° C.) the colors of the two patterns are no longer distinguishable from one another, which is one way to identify when this predetermined temperature is reached.

The simultaneous use of these thermochromic pigments in contiguous areas of a decoration makes it possible to effectively improve the visual perception of the temperature change of the cooking surface of a heating item. However, this type of heat indicator remains difficult for the user to discern at first glance, as the two areas each have a red color with similar chromatic values at room temperature. Moreover, the lack of discernibility between the colors of the patterns occurs in an area where the heat amplitude is at least 50° C. It follows that reading and assessing the temperature change are not easy, particularly for users who have not had any particular training. As a result, users tend to ignore the information provided by this heat indicator.

Therefore, there is a benefit in being able to provide a heat indicator that distinctly changes color and/or optical property with a temperature change, by showing, for example, distinctly different colors in the case of a colored heat indicator (change from green to red, for example).

Pigments of this type are described in patent document FR 2891844, in which CuMoW oxides showed reversible color changes under the effect of a temperature change and/or under the effect of mechanical stress, such as pressure of at least 105 Pa. However, these oxides, for which the color change is the result of a phase change, are particularly sensitive to cyclability. As a result, after a maximum of five cycles, it is no longer possible to return to the metastable alpha phase responsible for the green coloration at low temperatures. The benefit of using such a pigment as a colored heat indicator is therefore non-existent in practice for repeated use such as in cooking.

In order to remedy the problems of the functional coatings of the prior art, this invention aims to provide the user with a non-stick coating comprising at least one functional decorative layer, that can assist and guide the user of the item to which the coating in question is applied.

SUMMARY OF THE INVENTION

More specifically, the objective of this invention is a non-stick coating comprising at least one functional decorative layer, characterized in that the decorative layer comprises a pigment composition displaying a reversible change in optical and/or colorimetric properties when the coating is subjected, in part or in whole, to a temperature change between a cold temperature and a hot temperature, the cold temperature being between 0° C. and 40° C., and the hot temperature being between 80° C. and 400° C., and in that the pigment composition comprises at least one compound of formula (I), in the form of particles:

$$Y_{(3-x)}M_xFe_{(5-y)}Q_yO_{12} \qquad (I)$$

in which:

M is selected from the group consisting of lanthanides, alkaline metals, alkaline earth metals and metalloids with a degree of oxidation of +3;

Q is selected from the group consisting of lanthanides, non-metals with a degree of oxidation of +4, metals with a degree of oxidation of +3 or +4, transition metals with a degree of oxidation of +2 or +4, alkaline earth metals and alkaline metals;

x is between 0 and 0.3; and y is between 0 and 3.

Advantageously, M can be selected from the group consisting of La, Ce, Ca and Sr, and combinations thereof, and Q is selected from the group consisting of Si, Al, Ga, Ge, Ti, Cr, Ca, Sr and La, and combinations thereof.

Advantageously, the compound of formula (I) can have a structure of the garnet type.

For the purposes of this invention, the term "compound with a garnet structure" refers to a compound of the general formula $X_3T_2K_3O_{12}$ constructed from X, T and K cations that occupy coordination sites 12, 6 (octahedral coordination) and 4 (tetrahedral coordination), respectively:

X: Divalent transition elements surrounded by 8 oxygen atoms,

T: Trivalent transition elements surrounded by 6 oxygen atoms, in octahedral coordination, and K: Third constitutional group, surrounded by 4 oxygen atoms, in tetrahedral coordination.

The elements located in these different sites can be of very dissimilar chemical natures with different degrees of oxidation (DO) from one phase to another, the equilibrium of charges obviously always having to be maintained. Thus, the X cation can just as easily be an alkaline earth metal, or even a transition metal with DO +2, as a rare earth metal with DO +3 or even+2 or +4. The T cation will traditionally be a transition metal or a metalloid with DO +3, while the K cation will preferably be a metalloid or a transition metal with DO +3 or +4 (for example, $Fe^{3+}$, $Ti^{4+}$, etc.). It therefore appears that this garnet structure possesses exemplary flexibility, enabling many substitutions, and therefore a great range of physical properties.

For example, in the case of yttrium iron garnet with the formula $Y_3Fe_5O_{12}$, each iron octahedron is surrounded by 6 iron tetrahedrons and 6 yttrium atoms, each iron tetrahedron is surrounded by 4 iron octahedrons and 6 yttrium atoms, and finally each yttrium atom is surrounded by 4 iron octahedrons and 4 iron tetrahedrons.

The compounds of formula (I) with a garnet-type structure demonstrate continuous thermochromic properties and a distinct color change, advantageously a change of color from green to red, between a cold temperature and a hot temperature, the cold temperature being between 0° C. and 40° C. and the hot temperature being between 80° C. and 400° C. These compounds with a garnet structure offer a lot of flexibility, as it is possible to easily substitute all or part of the iron or yttrium atoms to modify the compound (crystal), and consequently its colorimetric properties. These compounds also possess excellent heat and chemical resistance properties.

Advantageously, the compound of formula (I) can be selected from among the following compounds:

$Y_3Fe_5O_{12}$
$Y_3Fe_{4.75}Ga_{0.25}O_{12}$
$Y_{2.85}La_{0.15}Fe_5O_{12}$
$Y_{2.75}Sr_{0.25}Fe_{4.75}Ge_{0.25}O_{12}$
$Y_{2.9}Sr_{0.1}Fe_{4.9}Ge_{0.1}O_{12}$
$Y_{2.75}Sr_{0.25}Fe_{4.75}Si_{0.25}O_{12}$
$Y_{2.9}Sr_{0.1}Fe_{4.9}Si_{0.1}O_{12}$
$Y_{2.9}Sr_{0.1}Fe_{4.9}Ti_{0.1}O_{12}$
$Y_{2.85}Sr_{0.15}Fe_{4.85}Ti_{0.1}O_{12}$
$Y_{2.75}Ca_{0.25}Fe_{4.75}Ge_{0.25}O_{12}$
$Y_{2.75}Ca_{0.25}Fe_{4.75}Si_{0.25}O_{12}$
$Y_3Fe_{4.5}Al_{0.5}O_{12}$
$Y_3Fe_{4.75}Al_{0.25}O_{12}$
$Y_3Fe_{4.4}Al_{0.5}Cr_{0.1}O_{12}$
$Y_3Fe_{4.65}Al_{0.25}Cr_{0.1}O_{12}$
$Y_3Fe_{4.75}Ge_{0.25}O_{12}$
$Y_3Fe_{4.75}Si_{0.25}O_{12}$
$Y_3Fe_{4.85}Cr_{0.15}O_{12}$
$Y_3Fe_3Al_2O_{12}$
$Y_3Al_3Fe_2O_{12}$

Advantageously, the compound of formula (I) can be such that y is between 0 and 0.5.

The decorative layer of the non-stick coating according to the invention comprises a pigment composition demonstrating a reversible change in optical and/or colorimetric properties when the coating is subjected, in part or in whole, to a temperature change between a cold temperature (between 0° C. and 40° C.) and a hot temperature (between 80° C. and 400° C.).

Advantageously, this hot temperature can be between 120° C. and 240° C.

In a first embodiment of the non-stick coating according to the invention, the decorative layer may be free of heat-stable binder.

In a second embodiment of the non-stick coating according to the invention, the decorative layer may comprise, in addition to the pigment composition, at least one heat-stable binder.

This heat-stable binder may be selected from the group consisting of enamels, fluorocarbon resins (alone or in a mixture), inorganic polymers or hybrid organic-inorganic polymers synthesized through a sol-gel process, silicones, silicone-polyesters, polyimides, polyphenylene sulfide (PPS), polyethylene sulfide (PES), polyether ether ketones (PEEK), polyether ketones (PEK), polyamide-imides (PAI), fluorosilicones and polybenzimidazoles (PBI), and mixtures thereof.

Advantageously, the decorative layer of the non-stick coating according to the invention may comprise at least one area in which the particles of the compound of formula (I) are in anisotropic form and are mostly inclined at an angle α of between 20° and 90° with respect to the medial plane of the decorative layer.

In this area in which the particles are inclined with respect to the medial plane of the decorative layer, we observe that the reflectivity is less than that observed on the surface of the rest of the decoration (places in which the particles are essentially horizontal).

For the purposes of this invention, the term "particles in anisotropic form" refers to particles the characteristic dimensions of which are not the same in all directions, such as fibers (essentially unidimensional in shape) or flakes (essentially two-dimensional or flat in shape).

Such an orientation of the anisotropic particles may be obtained in different ways, depending on the type of anisotropic particles used.

Thus, in the case of particles that can be oriented by a mechanical means (such as fibers), the essentially perpendicular orientation with respect to the coating layer, may, for example, be the result of positioning related to the coating application process, such as orientation through a unidirectional applicator like a micro-nozzle.

In the case of particles that can be oriented by a physical means (such as electrical or magnetic), the essentially perpendicular orientation of the anisotropic particles with respect to the coating layer may be the result of positioning occurring consecutively to or simultaneously with the application of the coating, such as the orientation of magnetizable particles under the effect of a magnetic field or electrifiable particles under the effect of an electrical field.

Advantageously, more than 66% and preferably more than 80% of said particles in anisotropic form can be inclined at an angle α of between 20° and 90° with respect to the medial plane of the film.

A high percentage of particles inclined at an angle α of between 20° and 90° with respect to the medial plane of the film makes it possible to improve the mechanical strengthening of the decorative layer by limiting the propagation of cracks prior to scaling.

The magnetizable particles may be of different natures.

They may be homogenous in nature, which is to say made up solely of the compound of formula (I), or of a composite nature, which is to say the magnetizable particles have a core-and-shell structure, in which the compound of formula (I) is in the core and/or the shell of said particles.

Advantageously, the magnetizable particles are composite particles in which the compound of formula (I) is in the shell of said particles, while the anisotropic core is non-magnetic (for example, made of mica or aluminum), magnetic or ferromagnetic (for example, made of iron oxide or stainless steel).

Advantageously, the coating according to the invention may also comprise at least one sub-layer and/or at least one finishing layer.

Advantageously, the pigment composition of the decorative layer of the non-stick coating according to the invention may also comprise at least one other thermochromic compound, and preferably bismuth oxide ($Bi_2O_3$).

Another objective of this invention is an item characterized in that it comprises a medium having two opposite surfaces, at least one of which is covered with a non-stick coating according to the invention.

In that which concerns the nature of the medium of the item, said item may be made of a material selected from metals, glass, ceramics and plastic materials. Preferably, an item for which the medium is a metal medium made of anodized or non-anodized aluminum (or an aluminum alloy), polished, brushed, microbead blasted, sand blasted or chemically treated aluminum (or aluminum alloy), a polished, brushed or microbead blasted stainless steel medium, a cast iron medium, or a hammered or polished copper medium.

The item according to the invention may advantageously be a cooking tool having a medium with a concave interior surface that can hold food and a convex exterior surface intended to be placed against a heat source.

The non-stick coating according to the invention is present on at least one of the interior and exterior surfaces. Advantageously, the non-stick coating according to the invention is present on the interior surface of the item.

Another objective of this invention is a first process of synthesizing a compound of formula (I) in the form of particles, through a solid process:

$$Y_{(3-x)}M_xFe_{(5-y)}Q_yO_{12} \qquad (I)$$

in which:

M is selected from the group consisting of lanthanides, alkaline metals, alkaline earth metals and metalloids with a degree of oxidation of +3;

Q is selected from the group consisting of lanthanides, non-metals with a degree of oxidation of +4, metals with a degree of oxidation of +3 or +4, transition metals with a degree of oxidation of +2 or +4, alkaline earth metals and alkaline metals;

x ranges from 0 to 0.3; and y ranges from 0 to 3;

the process comprising the following steps:

Co-grinding in an alcoholic medium of oxide powders of the elements comprising the compound of formula (I);

b) Heating the product of step (a) at a temperature of between 1200° C. and 1500° C. for 4 to 10 hours; and c) Cooling the product of step (b) to room temperature.

Advantageously, the alcoholic medium is ethanol-based.

Another objective of this invention is a second process of synthesizing a compound of formula (I) in the form of particles through a sol-gel process:

$$Y_{(3-x)}M_xFe_{(5-y)}Q_yO_{12} \qquad (I)$$

in which:

M is selected from the group consisting of lanthanides, alkaline metals, alkaline earth metals and metalloids with a degree of oxidation of +3;

Q is selected from the group consisting of lanthanides, non-metals with a degree of oxidation of +4, metals with a degree of oxidation of +3 or +4, transition metals with a degree of oxidation of +2 or +4, alkaline earth metals and alkaline metals;

x ranges from 0 to 0.3; and y ranges from 0 to 3;

the process comprising the following steps:

a) Mixing salts of the elements comprising the compound of formula (I) and at least one organic acid to form a gel;

b) Drying the gel from step (a);

c) Calcinating the product of step (b) at a temperature of between 500° C. and 700° C.;

d) Re-baking the product of step (c) at a temperature of between 800° C. and 1000° C. for at least 4 hours; and e) Cooling the product of step (d) to room temperature.

Advantageously, in this second synthesis process, nitrates will be used as the salts.

Advantageously, in this second synthesis process, citric acid will be used as the organic acid.

Another objective of this invention is a first process of preparing a non-stick coating according to the invention on at least one of the surfaces of a medium, characterized in that it comprises the following steps:

a) The provision of the compound of formula (I);

b) The production of the pigment composition comprising the compound of formula (I);

c) The production of a decorative layer composition comprising the pigment composition and a heat-stable binder;

d) The application of the decorative layer composition to the surface of the medium, to form a functional decorative layer; and e) Baking.

Another objective of this invention is a second process for preparing a non-stick coating according to the invention on at least one of the surfaces of a medium, characterized in that it comprises the following steps:

a) The provision of the compound of formula (I);

b) The production of the pigment compound comprising the compound of formula (I);

c) The production of a decorative layer composition comprising the pigment composition;

d) The application of the decorative layer composition to the surface of the medium to form a functional decorative layer;

e) The application of at least one finishing layer to the decorative layer; and f) Baking.

Another objective of this invention is a third process of preparing a non-stick coating according to the invention to at least one of the surfaces of a medium, characterized in that it comprises the following steps:

a) The provision of the compound of formula (I);
b) The production of the pigment composition comprising the compound of formula (I);
c) The production of a decorative layer composition comprising the pigment composition;
d) The application of the decorative layer composition to the surface of the medium previously coated with at least one sub-layer to form a functional decorative layer;
e) Baking.

Advantageously, this process of preparing a non-stick coating may advantageously also comprise the application of at least one finishing layer to the decorative layer between steps (d) and (e).

Advantageously, the decorative layer composition also comprises at least one heat-stable binder.

For all of the abovementioned non-stick coating preparation processes according to the invention, the compound of formula (I) may advantageously be obtained according to any of the synthesis processes according to the invention of compounds of formula (I).

For all of the abovementioned non-stick coating preparation processes according to the invention, at least one area of the decorative layer comprises particles of the compound of formula (I) in anisotropic form, the process also comprising, prior to the baking step, a step for orienting the particles of the compound of formula (I) in anisotropic form by a physical or mechanical means in the area.

Preferably, the particles of the compound of formula (I) in anisotropic form may be magnetizable, and the magnetizable particle orientation step may then be performed by applying a magnetic field or an electrical field, either during the step of applying the decorative layer composition, or after the step of applying the decorative layer composition and prior to the baking step.

BRIEF DESCRIPTION OF THE DRAWINGS

Other advantages and particularities of this invention will become apparent in the description below, which is provided as a non-limiting example, and in reference to the attached drawings.

DETAILED DESCRIPTION OF THE INVENTION

Figure 1:
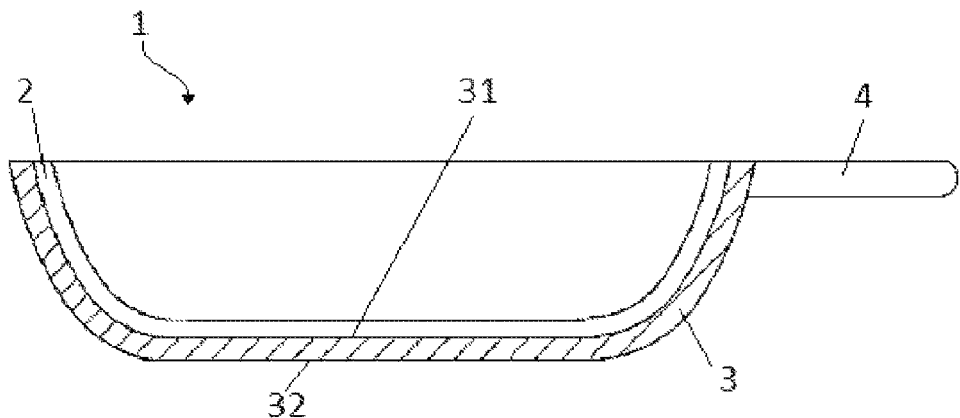
FIG. 1 is a schematic cross-section view of one example embodiment of a frying pan according to the invention.

In FIG. 1, there is a depiction, as an example, of a cooking tool according to the invention, a frying pan (1) that comprises a medium (3) in the form of a shallow dome and a gripping handle (4). The medium (3) comprises an interior surface (31) that is the surface oriented on the side where food can be placed in the frying pan (1), and an exterior surface (32), which is designed to be placed toward an external heat source. The medium (3) comprises, on its interior surface (31), a non-stick coating (2) according to the invention.

Figure 2:
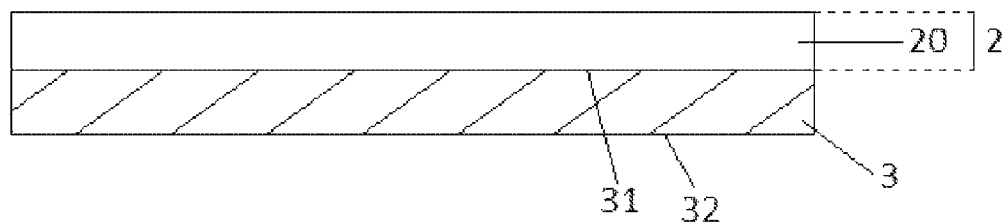
FIG. 2 depicts a schematic cross-section view of the frying pan in FIG. 1, provided with a single-layer coating according to the invention.

FIG. 2 depicts a schematic cross-section view of the frying pan in FIG. 1, provided with a single-layer non-stick coating (2) according to the invention. The non-stick coating (2) comprises a decorative layer (20) comprising at least one compound of formula (I).

Figure 3:
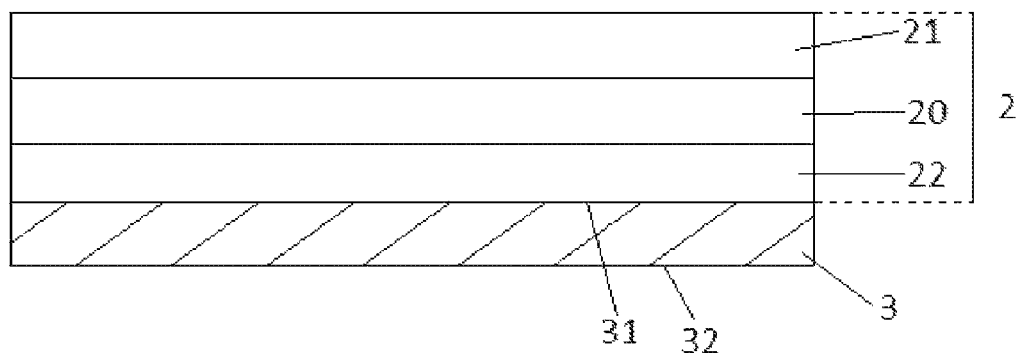
FIG. 3 depicts a schematic cross-section view of the frying pan in FIG. 1, provided with a single-layer non-stick coating according to the invention.

FIG. 3 depicts a schematic cross-section view of the frying pan in FIG. 1, provided with a single-layer non-stick coating (2) according to the invention. The non-stick coating (2) comprises a sub-layer (22), a finishing layer (21) and a decorative layer (20) comprising at least one compound of formula (I).

The invention is illustrated in greater detail in the following examples.

EXAMPLES

Example 1: Preparation, Through a Solid Process, of Pigment Compositions According to the Invention (PG1 to PG16)

The oxides are placed into a mechanical grinder in the proportions indicated in Table 1 in powder form (in keeping with the stoichiometry of the compound of formula (I) sought) in the presence of ethanol.

The grinding is performed for a duration that depends on the particle size of the oxide powders used and long enough to obtain a dispersion with an average aggregate particle size of approximately 2 μm.

The dispersion is poured into a crucible, dried to remove the ethanol and then brought to 1350° C. by heating at a speed of approximately 2° C./minute.

Each of the powders obtained (PG1 to PG16) is maintained at 1350° C. for six hours so as to produce the compound of formula (I) by interdiffusion of the oxides through a solid process.

Each of the powders (PG1 to PG16) obtained has an average particle size of around 2 μm.

The composition of each of the powders obtained (PG1 to PG16) is then analyzed by means of an X-ray diffraction (XRD) measurement and reported in Table 1.

The content by mass of the compound of formula (I) in each of the powders obtained (PG1 to PG16) is greater than or equal to 95%.

These powders (PG1 to PG16) each display a reversible change in colorimetric properties indicated in Table 1.

TABLE 1

|  | PG1 | PG2 | PG3 | PG4 | PG5 | PG6 | PG7 | PG8 |
| --- | --- | --- | --- | --- | --- | --- | --- | --- |
| $Y_2O_3$ (g) | 5.7 | 5.7 | 5.42 | 5.23 | 5.51 | 5.23 | 5.51 | 5.51 |
| $Fe_2O_3$ (g) | 4 | 3.8 | 4 | 3.8 | 3.92 | 3.8 | 3.92 | 3.92 |
| $Al_2O_3$ (g) | — | — | — | — | — | — | — | — |
| $Ga_2O_3$ (g) | — | 0.45 | — | — | — | — | — | — |

TABLE 1-continued

| | | | | | | | | |
|---|---|---|---|---|---|---|---|---|
| La$_2$O$_3$ (g) | — | — | 0.25 | — | — | — | — | — |
| SrCO$_3$ (g) | — | — | — | 0.37 | 0.15 | 0.37 | 0.15 | 0.15 |
| GeO$_2$ (g) | — | — | — | 0.24 | 0.1 | — | — | — |
| SiO$_2$ (g) | — | — | — | — | — | 0.26 | 0.1 | — |
| TiO$_2$ (g) | — | — | — | — | — | — | — | 0.15 |
| CaCO$_3$ (g) | — | — | — | — | — | — | — | — |
| Cr$_2$O$_3$ (g) | — | — | — | — | — | — | — | — |
| Ethanol (g) | 13 | 13 | 13 | 13 | 13 | 13 | 13 | 13 |
| Composition obtained by spectroscopy | Y$_3$Fe$_5$O$_{12}$ | Y$_3$Fe$_{4.75}$Ga$_{0.25}$O$_{12}$ | Y$_{2.85}$La$_{0.15}$Fe$_5$O$_{12}$ | Y$_{2.75}$Sr$_{0.25}$Fe$_{4.75}$Ge$_{0.25}$O$_{12}$ | Y$_{2.9}$Sr$_{0.1}$Fe$_{4.9}$Ge$_{0.1}$O$_{12}$ | Y$_{2.75}$Sr$_{0.25}$Fe$_{4.75}$Si$_{0.25}$O$_{12}$ | Y$_{2.9}$Sr$_{0.1}$Fe$_{4.9}$Si$_{0.1}$O$_{12}$ | Y$_{2.9}$Sr$_{0.1}$Fe$_{4.9}$Ti$_{0.1}$O$_{12}$ |
| Color at 20° C. | Green | Green | Green | Green | Green | Green | Green | Green |
| Color at 220° C. | Red | Red | Red | Red | Red | Red | Red | Red |

| | PG9 | PG10 | PG11 | PG12 | PG13 | PG14 | PG15 | PG16 |
|---|---|---|---|---|---|---|---|---|
| Y$_2$O$_3$ (g) | 5.42 | 5.23 | 5.23 | 5.7 | 5.7 | 5.7 | 5.7 | 5.7 |
| Fe$_2$O$_3$ (g) | 3.88 | 3.8 | 3.8 | 3.8 | 3.8 | 3.8 | 2.4 | 1.6 |
| Al$_2$O$_3$ (g) | — | — | — | — | — | — | 1.02 | 1.53 |
| Ga$_2$O$_3$ (g) | — | — | — | — | — | — | — | — |
| La$_2$O$_3$ (g) | — | — | — | — | — | — | — | — |
| SrCO$_3$ (g) | 0.22 | — | — | — | — | — | — | — |
| GeO$_2$ (g) | — | 0.24 | — | 0.24 | — | — | — | — |
| SiO$_2$ (g) | — | — | 0.26 | — | 0.25 | — | — | — |
| TiO$_2$ (g) | 0.22 | — | — | — | — | — | — | — |
| CaCO$_3$ (g) | — | 0.25 | 0.25 | — | — | — | — | — |
| Cr$_2$O$_3$ (g) | — | — | — | — | — | 0.11 | — | — |
| Ethanol (g) | 13 | 13 | 13 | 13 | 13 | 13 | 13 | 13 |
| Composition obtained by spectroscopy | Y$_{2.85}$Sr$_{0.15}$Fe$_{4.85}$Ti$_{0.15}$O$_{12}$ | Y$_{2.75}$Ca$_{0.25}$Fe$_{4.75}$Ge$_{0.25}$O$_{12}$ | Y$_{2.75}$Ca$_{0.25}$Fe$_{4.75}$Si$_{0.25}$O$_{12}$ | Y$_3$Fe$_{4.75}$Ge$_{0.25}$O$_{12}$ | Y$_3$Fe$_{4.75}$Si$_{0.25}$O$_{12}$ | Y$_3$Fe$_{4.85}$Cr$_{0.15}$O$_{12}$ | Y$_3$Fe$_3$Al$_2$O$_{12}$ | Y$_3$Al$_3$Fe$_2$O$_{12}$ |
| Color at 20° C. | Green | Green | Green | Green | Green | Brown-Green | Green | Light Green |
| Color at 220° C. | Red | Red | Red | Red | Red | Dark Red | Brown-Green | Dark Green |

Example 2: Preparation Through a Sol-Gel Process of Pigment Compositions According to the Invention (PG17 to PG20)

An aqueous solution is prepared by mixing together nitrates, demineralized water and citric acid, in the proportions indicated in Table 2 (for the nitrates: in keeping with the stoichiometry of the compound of formula (I) sought).

The pH of the solution is adjusted to 2 by adding a 25% ammonia solution.

The solution is gradually heated to 120° C. to remove the water and obtain a gel.

Drying is done for 30 minutes in order to ensure that nearly all of the water is removed.

The gel is calcinated at 550° C. for one hour, and then re-baked at 900° C. for 6 hours.

Each of the powders obtained (PG17 to PG20) has an average particle size of about 2 μm.

The composition of each of the powders obtained (PG17 to PG20) is analyzed using an X-ray Diffraction (XRD) measurement and is reported in Table 2 below.

The content by mass of the compound of formula (I) in each of the powders obtained is greater than or equal to 95%.

These powders (PG17 to PG20) each have a reversible colorimetric change indicated in Table 2 below.

TABLE 2

| | PG17 | PG18 | PG19 | PG20 |
|---|---|---|---|---|
| Fe(NO$_3$)$_9$H$_2$O (g) | 12.6 | 13.3 | 12.32 | 13.02 |
| Y(NO$_3$)$_6$H$_2$O (g) | 7.8 | 7.8 | 7.8 | 7.8 |
| Al(NO$_3$)$_9$H$_2$O (g) | 1.26 | 0.63 | 1.26 | 0.63 |
| Cr(NO$_3$)$_9$H$_2$O (g) | — | — | 0.28 | 0.28 |
| Demineralized water (g) | 216.6 | 223.6 | 216.6 | 217.3 |
| Citric acid (g) | 61.4 | 62 | 60 | 60 |
| Composition obtained by spectroscopy | Y$_3$Fe$_{4.5}$Al$_{0.5}$O$_{12}$ | Y$_3$Fe$_{4.75}$Al$_{0.25}$O$_{12}$ | Y$_3$Fe$_{4.4}$Al$_{0.5}$Cr$_{0.1}$O$_{12}$ | Y$_3$Fe$_{4.65}$Al$_{0.25}$Cr$_{0.1}$O$_{12}$ |
| Color at 20° C. | Green | Green | Green | Green |
| Color at 220° C. | Red | Red | Red | Red |

Example 3: Preparation of Decorative Layer Compositions without Binder (SGD1)

The following components are added to a grinder and then ground and stirred to produce a decorative layer composition.

| Compound | Percentage by mass |
| --- | --- |
| Pigment composition from Example 1 or 2 | 67.70 |
| Terpineol | 6.05 |
| Propylene glycol | 6.05 |
| Isopropanol | 20.20 |

Example 4: Preparation of Decorative Layer Sol-Gel Compositions (SGD2)

The compounds of Part A are added to a grinder, and then ground and stirred to produce a paste.

The compounds of Part B are simply mixed together to combine.

In separated form, Parts A and B can be stored for several weeks.

Prior to use, Parts A and B are combined.

The mixture is allowed to stand for at least 6 hours to produce a decorative layer sol-gel composition. In this form, the sol-gel composition can be stored for several days.

| Part | Compound | Percentage by mass |
| --- | --- | --- |
| A | 30% colloidal silica | 27.41 |
| A | Demineralized water | 7.13 |
| A | Isopropanol | 2.74 |
| A | Butyl glycol | 0.88 |
| A | Pigment composition from Example 1 or 2 | 13.00 |
| A | Alumina | 11.51 |
| B | Methyl triethoxy ethanol | 36.16 |
| B | Formic acid | 0.36 |
| B | Silicone oil 47V50 | 0.81 |

Example 5: Preparation of a Surface Layer Sol-Gel Composition (SGS)

The compounds of Part A are added to a mixer and stirred.

The same procedure is followed for each of Parts B and C.

In separated form, Parts A, B and C can be stored for several months.

Prior to use, Parts A, B and C are combined.

The mixture is allowed to stand for at least 6 hours to produce a surface layer sol-gel composition. In this form, the sol-gel composition can be stored for several days.

| Part | Compound | Percentage by mass |
| --- | --- | --- |
| A | 30% colloidal silica | 31.79 |
| B | Water | 8.26 |
| B | Acetic acid | 1.53 |
| B | Isopropanol | 3.18 |
| B | Butyl glycol | 3.05 |
| B | Silicone oil 47V50 | 0.87 |
| B | Methyl triethoxysilane | 41.96 |
| C | Butyl glycol | 9.08 |
| C | Metal flakes | 0.18 |
| C | Spreading agent | 0.10 |

Example 6: Preparation of a Bottom Layer Sol-Gel Composition (SGF)

The compounds of Part A are added to a grinder and then ground and stirred to produce a paste.

The compounds of Part B are simply mixed together to combine. In separated form, Parts A and B can be stored for several weeks.

Prior to use, Parts A and B are combined.

The mixture is allowed to stand for at least 6 hours to produce a bottom layer sol-gel composition. In this form, the sol-gel composition can be stored for several days.

| Part | Compound | Percentage by mass |
| --- | --- | --- |
| A | 30% colloidal silica | 27.41 |
| A | Demineralized water | 7.13 |
| A | Isopropanol | 2.74 |
| A | Butyl glycol | 0.88 |
| A | Spinel black (CuCoMn) | 0.37 |
| A | Titanium dioxide | 12.63 |
| A | Alumina | 11.51 |
| B | Methyl triethoxy ethanol | 36.16 |
| B | Formic acid | 0.36 |
| B | Silicone oil 47V50 | 0.81 |

Example 7: Preparation of Decorative Layer Compositions without Binder (FFD1)

The following compounds are added to a grinder and then ground and stirred to produce a decorative layer composition. This decorative layer can be used as-is and can be stored for a few hours.

| Compound | Percentage by mass |
| --- | --- |
| Pigment composition from Example 1 or 2 | 10.94 |
| Demineralized water | 24.80 |
| Monopropylene glycol | 64.26 |

Example 8: Preparation of Decorative Layer Fluorinated Compositions (FFD2)

The composition is obtained by simply mixing together the different compounds. As-is, the composition can be stored for several days.

| Compound | Percentage by mass |
| --- | --- |
| Aqueous PTFE dispersion | 70.18 |
| FFD1 composition | 26.49 |
| Anti-foaming agent | 2.22 |
| 10.25% ammonia solution | 1.11 |

Example 9: Preparation of Decorative Layer Fluorinated Compositions (FFD3)

The composition is obtained by simply mixing together the different compounds. As-is, the composition can be stored for several days.

| Compound | Percentage by mass |
| --- | --- |
| Aqueous PTFE dispersion | 52.7 |
| Metal flakes | 0.2 |

-continued

| Compound | Percentage by mass |
| --- | --- |
| FFD1 composition | 17.2 |
| 30% colloidal silica | 4.3 |
| PAI adhesive resin | 12.9 |
| Aqueous acrylic polymer dispersion | 8.6 |
| Demineralized water | 4.1 |

Example 10: Preparation of a Bottom Layer Fluorinated Composition (FFF)

The composition is obtained by simply mixing together the different compounds. As-is, the composition can be stored for several days.

| Compound | Percentage by mass |
| --- | --- |
| Aqueous PTFE dispersion | 61.0 |
| Metal flakes | 0.2 |
| 25% carbon black solution | 4.0 |
| 30% colloidal silica | 5.0 |
| PAI adhesive resin | 15.0 |
| Aqueous acrylic polymer dispersion | 10.0 |
| Demineralized water | 4.8 |

Example 11: Preparation of a Surface Layer Fluorinated Composition (FFS)

The composition is obtained by simply mixing together the different compounds. As-is, the composition can be stored for several days.

| Compound | Percentage by mass |
| --- | --- |
| Aqueous PTFE dispersion | 85.0 |
| Metal flakes | 0.2 |
| Aqueous acrylic polymer dispersion | 10.0 |
| Demineralized water | 4.8 |

Example 12: Preparation of an Item Incorporating a Decorative Layer According to the Invention An aluminum alloy disc is degreased and brushed in order to remove any greasy surface substances and oxides from the surfaces of the disc.

The decorative layer fluorinated composition (FFD3), prepared using pigment composition PG1, is applied to one of the surfaces of the disc by serigraphy.

After drying, the coated disc is baked at 415° C. for 7 minutes to obtain a disc comprising a single-layer fluorinated non-stick coating.

The disc is then stamped to produce a dome that is coated on its interior surface.

The coating obtained is green in color at room temperature (20° C.).

The coated dome is heated to 220° C.; a gradual color change of the coating, from the initial green color to a red color, is observed during heating.

The dome is allowed to cool to room temperature; a gradual color change of the coating, from the red color to the initial green color, is observed during cooling.

A series of 10 heating and cooling cycles is performed as described above; the coating displays the same changes in colorimetric properties each time.

Example 13: Preparation of an Item Incorporating a Decorative Layer According to the Invention An aluminum alloy disc is degreased and brushed so as to remove any greasy surface substances and oxides from the surfaces of the disc.

The bottom layer fluorinated composition (FFF) is applied to one of the surfaces of the disc by serigraphy and then dried.

The decorative layer fluorinated composition (FFD1), prepared from pigment composition PG15, is applied by tampography to one part (circular imprint measuring 50 mm in diameter) of the surface of the disc coated with the bottom layer. The decorative layer is then dried.

The surface layer fluorinated composition (FFS) is then applied by serigraphy to the surface of the disc coated with the bottom layer and the decorative layer, and then dried.

The coated disc is baked at 415° C. for 7 minutes to obtain a disc comprising a multi-layer fluorinated non-stick coating. The disc is then stamped to produce a dome coated on its interior surface.

The coating obtained displays a decoration that is green in color at room temperature (20° C.) on a black background (corresponding to the bottom layer).

The coated dome is heated to 220° C.; a gradual color change of the decorative layer, from the initial green to a brown-green color, is observed during heating, while the colorimetric properties of the black background do not change.

The dome is allowed to cool to room temperature; a gradual color change of the decoration, from the brown-green color to the initial green color, is observed during cooling, while the colorimetric properties of the black background do not change.

A series of 10 heating and cooling cycles are performed as described above; the decoration displays the same changes in colorimetric properties each time.

Example 14: Preparation of an Item Incorporating a Decorative Layer According to the Invention An aluminum alloy disc is degreased and brushed in order to remove any greasy surface substances and oxides from the surfaces of the disc.

The bottom layer fluorinated composition (FFF) is applied to one of the surfaces of the disc by serigraphy, and then dried.

The decorative layer fluorinated composition (FFD1), prepared from pigment composition PG16, is applied by tampography to one part (circular imprint measuring 50 mm in diameter) of the surface of the disc coated with the bottom layer. The decorative layer is then dried.

The surface layer fluorinated composition (FFS) is then applied by serigraphy to the surface of the disc coated with the bottom layer and the decorative layer, and then dried.

The coated disc is baked at 415° C. for 7 minutes to obtain a disc comprising a multi-layer fluorinated non-stick coating. The disc is then stamped to produce a dome that is coated on its interior surface.

The coating obtained displays a light-green-colored decoration at room temperature (20° C.) on a black background (corresponding to the bottom layer).

The coated dome is heated to 220° C.; a gradual color change of the decoration, from the initial light green color to a dark green color, is observed during heating, while the colorimetric properties of the black background do not change.

The dome is allowed to cool to room temperature; a gradual color change of the decoration, from the dark green color to the initial light green color, is observed during cooling, while the colorimetric properties of the black background do not change.

A series of 10 heating and cooling cycles is performed as described above; the decoration displays the same changes in colorimetric properties each time.

Example 15: Preparation of an Item Incorporating a Decoration Layer According to the Invention An aluminum alloy disc is degreased and brushed so as to remove any greasy surface substances and oxides from the surfaces of the disc.

The bottom layer fluorinated composition (FFF) is applied to one of the surfaces of the disc by serigraphy, and then dried.

The decorative layer fluorinated composition (FFD2), prepared from pigment composition PG18, is applied by serigraphy to the surface of the disc coated with the bottom layer, to produce a checkerboard pattern of squares measuring 4 mm on a side. The decorative layer is then dried.

The surface layer fluorinated composition (FFS) is then applied by serigraphy to the surface of the disc coated with the bottom layer and the decorative layer, and then dried.

The coated disc is baked at 415° C. for 7 minutes to obtain a disc comprising a multi-layer fluorinated non-stick coating.

The disc is then stamped to produce a dome coated on its interior surface.

The coating obtained displays a decoration that is green in color at room temperature (20° C.) on a black background (corresponding to the bottom layer).

The coated dome is heated to 220° C.; a gradual color change of the decoration, from the initial green color to a red color, is observed during heating, while the colorimetric properties of the black background do not change.

The dome is allowed to cool to room temperature; a gradual color change of the decoration, from the red color to the initial green color, is observed during cooling, while the colorimetric properties of the black background do not change.

A series of 10 heating and cooling cycles is performed as described above; the decoration displays the same changes in colorimetric properties each time.

Example 16: Preparation of an Item Incorporating a Decorative Layer According to the Invention A stainless steel dome is degreased and brushed so as to remove any greasy surface substances and oxides from the surfaces of the dome.

The decorative layer sol-gel composition (SGD2), prepared using pigment composition PG1, is applied by spray to the interior surface of the dome.

The decorative layer is then dried and baked for 15 minutes at 280° C.

The coating obtained is green in color at room temperature (20° C.). The coated come is heated to 220° C.; a gradual color change in the coating, from the initial green color to a red color, is observed during heating.

The dome is allowed to cool to room temperature; a gradual color change in the coating, from the red color to the initial green color, is observed during cooling.

A series of 10 heating and cooling cycles is performed as described above; the coating displays the same changes in colorimetric properties each time.

Example 17: Preparation of an Item Incorporating a Decorative Layer According to the Invention An aluminum dome is degreased and brushed so as to remove any greasy surface substances or oxides from the surfaces of the dome.

The bottom layer sol-gel composition (SGF) is applied to the interior surface of the dome by spray, and then dried.

The decorative layer sol-gel composition (SGD1), prepared using pigment composition PG19, is applied by tampography to one part (circular imprint measuring 50 mm in diameter) of the surface of the disc coated with the bottom layer.

The surface layer sol-gel composition (SGS) is then applied by spray to the surface of the disc coated with the bottom layer and the decorative layer, and then dried and finally baked for 20 minutes at 280° C.

The coating obtained has a green-colored decoration at room temperature (20° C.) on a gray background (corresponding to the bottom layer).

The coated dome is heated to 220° C.; a gradual color change in the decoration, from the initial green color to a red color, is observed during heating, while the colorimetric properties of the gray background do not change.

The dome is allowed to cool to room temperature; a gradual color change of the decoration, from the red color to the initial green color, is observed during cooling, while the colorimetric properties of the gray background do not change.

A series of 10 heating and cooling cycles is performed as described above; the decoration displays the same changes in colorimetric properties each time.

Example 18: Preparation of an Item Incorporating a Decorative Layer According to the Prior Art An aluminum alloy disc is degreased and brushed so as to remove any greasy surface substances and oxides from the surfaces of the disc.

The bottom layer fluorinated composition (FFF) is applied to one of the surfaces of the disc by serigraphy, and then dried.

A decorative layer composition is prepared by adding the compounds listed below to a grinder, and then grinding and stirring them.

| Compound | Percentage by mass |
| --- | --- |
| $Fe_2O_3$ (hematite) | 10.94 |
| Demineralized water | 24.80 |
| Monopropylene glycol | 64.26 |

The decorative layer composition is applied by tampography to one part (circular imprint measuring 50 mm in diameter) of the surface of the disc coated with the bottom layer. The decorative layer is then dried.

The surface layer fluorinated composition (FFS) is then applied by serigraphy to the surface of the disc coated with the bottom layer and the decorative layer, and then dried.

The coated disc is baked at 415° C. for 7 minutes to obtain a disc comprising a multi-layer fluorinated non-stick coating.

The disc is then stamped to produce a dome that is coated on its interior surface.

The coating obtained displays a decoration that is brown-red in color at room temperature (20° C.) on a black background (corresponding to the bottom layer).

The coated dome is heated to 220° C.; a gradual color change in the decoration, from the initial brown-red color to a slightly darker brown-red color, is observed during heating, while the colorimetric properties of the black background do not change.

The dome is allowed to cool to room temperature; a gradual color change in the decoration, from the slightly darker brown-red color to the initial brown-red color, is observed during cooling, while the colorimetric properties of the black background do not change.

Without a reference color, it is not possible to see that the hot temperature has been reached. It is therefore impossible to distinguish, at first glance, whether the frying pan is hot or cold, thus creating a safety problem.

The invention claimed is:

1. Non-stick coating comprising at least one functional decorative layer, wherein the decorative layer comprises a pigment composition displaying a reversible change in optical and/or colorimetric properties when the coating is subjected, in part or in whole, to a temperature change between a cold temperature and a hot temperature, the cold temperature being between 0° C. and 40° C. and the hot temperature being between 80° C. and 400° C., and wherein the pigment composition comprises at least one compound of formula (I) being in the form of particles:

$$Y_{(3-x)}M_xFe_{(5-y)}Q_yO_{12} \quad (I)$$

in which:
M is selected from the group consisting of lanthanides, alkaline metals, alkaline earth metals and metalloids with a degree of oxidation of +3;
Q is selected from the group consisting of lanthanides, non-metals with a degree of oxidation of +4, metals with a degree of oxidation of +3 or +4, transition metals with a degree of oxidation of +2 or +4, alkaline earth metals and alkaline metals;
x is between 0 and 0.3; and
y is between 0 and 3.

2. Coating according to claim 1, in which:
M is selected from the group consisting of La, Ce, Ca and Sr, and combinations thereof; and
Q is selected from the group consisting of Si, Al, Ga, Ge, Ti, Cr, Ca, Sr and La, and combinations thereof.

3. Coating according to claim 1, in which the compound of formula (I) possesses a garnet-type structure.

4. Coating according to claim 1, in which the compound of formula (I) is selected from among the following compounds:
$Y_3Fe_5O_{12}$
$Y_3Fe_{4.75}Ga_{0.25}O_{12}$
$Y_{2.85}La_{0.15}Fe_5O_{12}$
$Y_{2.75}Sr_{0.25}Fe_{4.75}Ge_{0.25}O_{12}$
$Y_{2.9}Sr_{0.1}Fe_{4.9}Ge_{0.1}O_{12}$
$Y_{2.75}Sr_{0.25}Fe_{4.75}Si_{0.25}O_{12}$
$Y_{2.9}Sr_{0.1}Fe_{4.9}Si_{0.1}O_{12}$
$Y_{2.9}Sr_{0.1}Fe_{4.9}Ti_{0.1}O_{12}$
$Y_{2.85}Sr_{0.15}Fe_{4.85}Ti_{0.15}O_{12}$
$Y_{2.75}Ca_{0.25}Fe_{4.75}Ge_{0.25}O_{12}$
$Y_{2.75}Ca_{0.25}Fe_{4.75}Si_{0.25}O_{12}$
$Y_3Fe_{4.5}Al_{0.5}O_{12}$
$Y_3Fe_{4.75}Al_{0.25}O_{12}$
$Y_3Fe_{4.4}Al_{0.5}Cr_{0.1}O_{12}$
$Y_3Fe_{4.65}Al_{0.25}Cr_{0.1}O_{12}$
$Y_3Fe_{4.75}Ge_{0.25}O_{12}$
$Y_3Fe_{4.75}Si_{0.25}O_{12}$
$Y_3Fe_{4.85}Cr_{0.15}O_{12}$
$Y_3Fe_3Al_2O_{12}$
$Y_3Al_3Fe_2O_{12}$ 5. Coating according to claim 1, in which y is between 0 and 0.5.

6. Coating-according to claim 1, in which the hot temperature is between 120° C. and 240° C.

7. Coating according to claim 1, in which the decorative layer does not contain a heat-stable binder.

8. Coating according to claim 1, in which the decorative layer comprises, in addition to the pigment composition, at least one heat-stable binder.

9. Coating according to claim 8, in which the heat-stable binder is selected from the group consisting of enamels, fluorocarbon resins alone or in a mixture, inorganic polymers or organic-inorganic hybrid polymers synthesized through a sol-gel process, silicones, silicone-polyesters, polyimides, polyphenylene sulfides (PPS), polyethylene sulfides (PES), polyether ether ketones (PEEK), polyether ketones (PEK), polyamide-imides (PAI), fluorosilicones and polybenzimidazoles (PBI), and mixtures thereof.

10. Coating according to claim 1, in which the pigment composition also comprises at least one other thermochromic compound.

11. Coating according to claim 10, in which the pigment composition also comprises bismuth oxide.

12. Item comprising a medium having two opposite surfaces, at least one of which is covered in a coating as defined according to claim 1.

13. Item according to claim 12, in the form of a cooking tool in which the medium has a concave interior surface intended to be positioned on the side where food might be placed in the item, and a convex exterior surface intended to be positioned toward a heat source.

* * * * *

UNITED STATES PATENT AND TRADEMARK OFFICE
CERTIFICATE OF CORRECTION

PATENT NO. : 9,758,681 B2
APPLICATION NO. : 15/323992
DATED : September 12, 2017
INVENTOR(S) : Stephanie Le Bris et al.

Page 1 of 1

It is certified that error appears in the above-identified patent and that said Letters Patent is hereby corrected as shown below:

Column 18, Line 11, Claim 4, delete "$Y_{2.85}\ Sr_{0.15}Fe_{4.85}Ti_{0.15}O_{12}$" and insert -- $Y_{2.85}Sr_{0.15}Fe_{4.85}Ti_{0.15}O_{12}$ --

Column 18, Line 12, Claim 4, delete "$Y_{2.75}Ca_{0.25}Fe_{4.75}Ge_{0.25}O_{12}$" and insert -- $Y_{2.75}Ca_{0.25}Fe_{4.75}Ge_{0.25}O_{12}$ --

Column 18, Line 25, Claim 6, delete "Coating-according" and insert -- Coating according --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*